Dec. 10, 1946.   T. S. WILSON ET AL   2,412,548
TORSIOGRAPH
Filed July 24, 1941   2 Sheets-Sheet 1
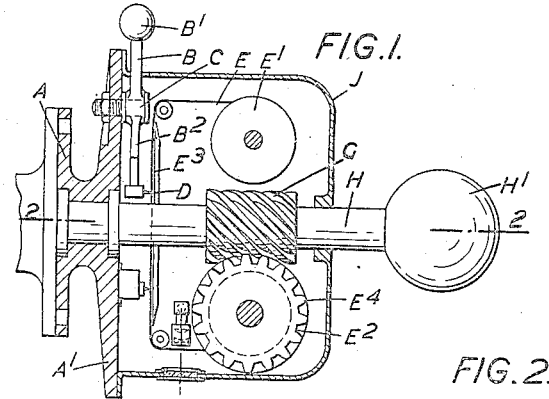
FIG. 1.
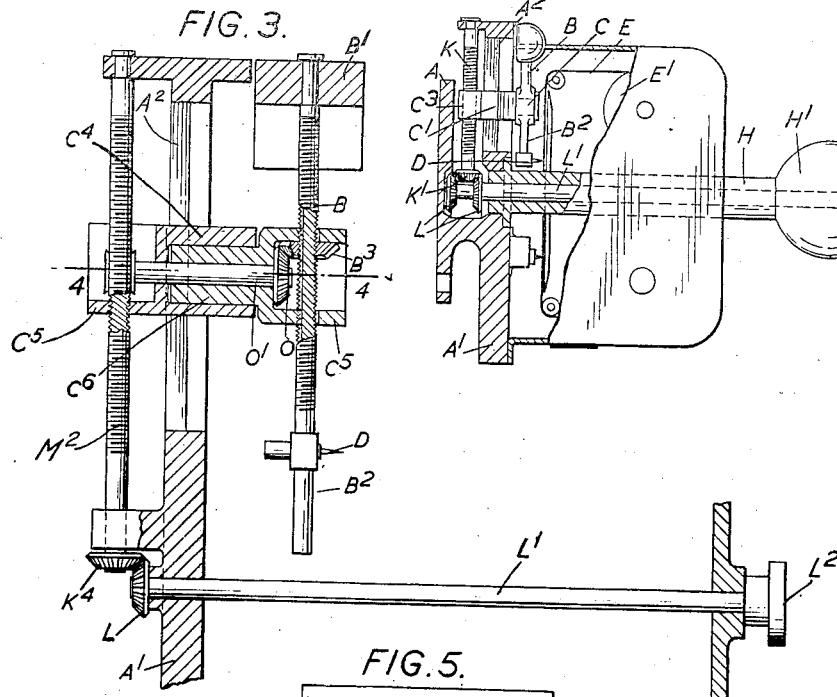
FIG. 2.
FIG. 3.
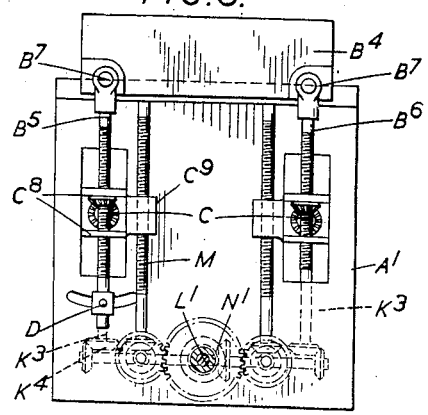
FIG. 5.
INVENTORS
T. S. WILSON
BY R. ZDANOWICH
ATTORNEYS Dec. 10, 1946.  T. S. WILSON ET AL  2,412,548
TORSIOGRAPH
Filed July 24, 1941   2 Sheets-Sheet 2

INVENTORS
T. S. WILSON
R. Z. DANOWICH
BY Blair & Kilcoyne
ATTORNEYS

Patented Dec. 10, 1946

2,412,548

UNITED STATES PATENT OFFICE 2,412,548

TORSIOGRAPH

Thomas Sydney Wilson and Richard Zdanowich, London, England, assignors to D. Napier & Son Limited, London, England, a British company Application July 24, 1941, Serial No. 403,932
In Great Britain July 29, 1940

8 Claims. (Cl. 234—5.6)

This invention relates to torsiographs and has for its object to provide a construction which has not those disadvantages which are present in certain known constructions of such instruments.

In order to have a clear perception of the present invention and the objects sought to be obtained, most torsiographs as proposed or in use, operate on what may be called the seismographic principle in that for the recording of the torsional vibrations reliance is placed on the relative movements of a mass, which is rigidly connected to the shaft whose torsional vibrations are to be recorded, and a flywheel which is flexibly connected to the mass. The arrangement is such that under favourable conditions the mass vibrates with the shaft while the flywheel is substantially unaffected so that it can be regarded as relatively stationary. Mechanical or electrical means have been employed to enable the relative movement of these two masses to be recorded in various ways. An instrument of this type tends to have certain defects. For example, owing to the necessity for a flexible connection between the flywheel and the mass whose torsional vibrations are to be recorded, the instrument possesses a natural frequency of its own which interferes with the recording of the torsional vibrations. Again, owing to constructional limitations the flywheel cannot be regarded as relatively stationary in that it does not rotate with a uniform speed. To ensure steady rotational speed the flywheel mass would have to possess an infinitely large inertia which is of course impossible to provide in practice. There are also almost inevitable complications due to the mechanical or electrical means employed for obtaining the record and finally with this type of instrument any powerful harmonic order of torsional vibrations invariably tends to swamp out, obliterate or interfere with all or some of the weaker orders. Hence an instrument of this type has to be frequently calibrated and tuned and the records obtained tend to be unreliable or unsatisfactory.

According to this invention a torsiograph record is obtained by a method in which the record is made by a stylus by a mass which, while subjected to centrifugal force as the shaft on which it is mounted rotates, will swing as a pendulum in accordance with the torsional vibrations of the shaft about at least one axis which is not coincident with the shaft axis. In carrying this method into practice there is combined with the shaft whose torsional vibrations are to be recorded, a mass which is mounted on that shaft so that it can swing thereon as a pendulum about at least one axis which is in a determined position in relation to the shaft axis and is parallel to but not coincident with the shaft axis, and a stylus which is moved by and in accordance with the movements of the pendulum mass with respect to the axis of the shaft as the shaft rotates, this stylus making a record on a strip which can move relatively to the stylus but rotates as a whole with the shaft.

Accordingly, it is the main object of the present invention to provide a reliable, efficient and accurate device adapted to avoid the objections heretofore noted in prior instruments of this character.

The invention may be carried into practice in various alternative ways as shown more or less diagrammatically and by way of example in the accompanying drawings in which, Figure 1 is a sectional elevation of a simple form of the improved torsiograph.

Figure 2 is a similar view of a like arrangement, but provided with means for adjusting the radial distance of the fulcrum of the pendulum lever.

Figure 3 is again a similar view showing means for altering not only the distance of the pendulum fulcrum from the axis of the shaft, but also the length of the pendulum arm.

Figure 5 is an end view looking in the direction of the shaft axis and showing a modified construction in which bi-filar suspension is employed for the pendulum mass.

Figure 4:
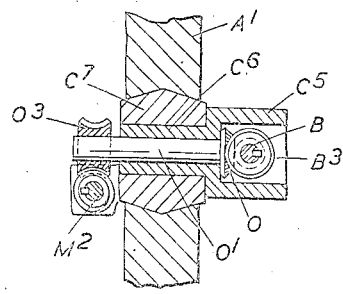
Figure 4 is a section through the fulcrum carrying member on the line 4—4 in Figure 3.

In each case the apparatus is conveniently mounted in some suitable manner on a part or member which may be termed a carrier and is formed on or connected to the shaft whose vibrations are to be recorded. In a simple arrangement the carrier may be in the form of a member provided, for example, with two flanges of which one A is adapted to be bolted on to the end of the shaft whose vibrations are to be recorded. The second flange $A^1$ has mounted thereon the various parts described hereunder as comprised in the torsiograph.

Taking first a simple form of the invention as shown in Figure 1, there is suitably pivoted on the flange $A^1$ of the carrier a two-armed lever which constitutes the pendulum by means of which the torsional vibrations are recorded. On the end of one arm B of this lever is a mass $B^1$ of suitable form which with the lever can swing about the fulcrum C as the shaft rotates and in accordance with the torsional vibrations of that shaft. The second arm $B^2$ of the lever is directed inwardly towards the axis Z—Z of the carrier, and in some cases may extend beyond that axis. On this arm there is mounted a stylus D of suitable type which lies in contact with a strip of material E which travels from one roller $E^1$ to another roller $E^2$ over a platen $E^3$. The movements of the pendulum arm B will be recorded by this stylus D with such a degree of magnification as may be determined in accordance with the relation between the distance of the stylus from the fulcrum C of the two-armed lever and the length of the pendulum arm B of that lever.

The drum or roller $E^2$ on which one end of the record strip is wound is provided with a worm wheel $E^4$ which meshes with a worm G on a shaft H rotatably supported on and coaxial with the carrier and projecting from the face of the carrier flange $A^1$ along the carrier axis. On the end of this shaft is a ball or like enlargement $H^1$. This shaft H can rotate with the carrier A $A^1$ and the shaft whose torsional vibrations are to be recorded and when so rotated the record strip E will be stationary. When a record is required the end $H^1$ of the worm shaft H is held against rotation when the record strip will commence to move owing to the drum $E^2$ being rotated about the stationary worm G.

The mechanism is conveniently enclosed in a casing J through an opening in which the pendulum arm B projects.

In the modified construction shown in Figure 2 the pendulum lever may be mounted so that the radial distance of its fulcrum C from the carrier axis can be varied, if necessary while the apparatus is in use on a rotating shaft. To effect this adjustment the fulcrum of the pendulum lever is mounted on a member $C^1$ which can slide radially on a rod $A^2$ on the carrier. This arrangement comprises a rotatable radially arranged threaded shaft K which engages a nut $C^3$ forming part of the member $C^1$ which carries the fulcrum C of the pendulum. This threaded shaft K carries at its inner end a bevel pinion $K^1$ meshing with one or the other of two bevel pinions L on a shaft $L^1$ rotatably mounted within the worm-carrying shaft H. These two pinions L are arranged oppositely and the shaft $L^1$ is movable in the axial direction by means of a head $L^2$ on its outer end to bring one or the other of the pinions L into engagement with the pinion $K^1$ so that the threaded radial shaft can be rotated in either direction as desired. When the head $L^2$ on the outer end of the shaft $L^1$ is held, if the carrier is rotating, or if the head $L^2$ itself is turned when the carrier and torsiograph are stationary, the radial position of the fulcrum C of the pendulum lever B will be varied. Such an arrangement enables movement of the fulcrum member $C^1$ of the pendulum to be effected in either direction while the shaft and carrier A $A^1$ continue to rotate in one direction.

In the modification shown in Figures 3 and 4 means are provided for varying, either when the carrier is stationary or as it is rotating, not only the distance of the pendulum fulcrum from the carrier axis but also the length of the pendulum arm. The member $C^4$ which supports the pendulum and provides a fulcrum is slidably mounted in a suitable guide slot $A^2$ in the carrier $A^1$. A worm shaft $M^2$ is mounted on the carrier in radial disposition and extends through a threaded bore in an extension $C^5$ of the member $C^4$, so that the latter is moved radially of the carrier as the shaft $M^2$ is turned. This shaft $M^2$ can be rotated by means of a bevel wheel $K^4$ on the end of this shaft and a bevel wheel L on a shaft $L^1$ which is rotatably carried on the carrier axis and has at its outer end a head $L^2$ by means of which this shaft can be turned. This will cause the radial distance of the fulcrum supporting member $C^4$ from the axis of the carrier to be varied. The pendulum lever B is carried in a cup-like member $C^5$ with a stem $C^6$ which constitutes the fulcrum of the pendulum and can oscillate freely in the supporting member $C^4$. The pendulum rod B $B^2$ passes through and across this cup-like member $C^5$, being screwthreaded and free to slide therethrough but restrained against rotation. On the pendulum rod within the cup $C^5$ is a bevel wheel $B^3$ internally threaded to engage the screwthread on the pendulum rod, the arrangement being such that if this bevel wheel is turned the pendulum rod B $B^2$ will be moved through the cup $C^5$ thus altering the length of the pendulum arm B. With either the bevel wheel $B^3$ on the pendulum rod engages a bevel wheel O on one end of a short shaft $O^1$ which runs through and can rotate within the fulcrum stem $C^6$ of the cup member $C^5$. A worm wheel $O^3$ on the opposite end of this short shaft engages the worm shaft $M^2$. When shaft $M^2$ is turned relatively to the carrier by means of knob $L^2$ acting through shaft $L^1$ and bevel gears L and $K^4$ the distance of the pendulum fulcrum from the carrier axis will be varied and at the same time the length of the pendulum rod will be altered. The pitch of the thread on the radial shaft $M^2$ and of that on the pendulum rod B $B^2$ together with the dimensions of the bevel gearing may be determined so that the distance of the pendulum mass $B^1$ from the carrier axis will not be varied while the radial position of the pendulum fulcrum and consequently the length of the pendulum rod are being altered. At the same time of course the distance of the stylus from the fulcrum of the pendulum rod will vary in relation to the varying length of the pendulum rod itself. The stylus D as shown in Figure 3 can slide on the rod $B^2$ being guided by any suitable guide means, not shown in the drawings. Alternatively the stylus may be adjustably fixed on the rod $B^2$.

Either of the above described arrangements may be applied to a pendulum having bi-filar suspension. In that case as shown in Figure 5 the pendulum mass $B^4$ is carried, for example towards its ends, by two rods $B^5$ $B^6$ to the ends of which the mass is pivoted at $B^7$. Each of these rods passes through a fulcrum member $C^8$ mounted in a supporting member $C^9$ radially movable on the carrier. By means of bevel gearing and mechanism as described with reference to Figure 3, or by other suitable mechanism, the lengths of the twin pendulum rods $B^5$ $B^6$ can be altered with respect to their fulcra C and these fulcra can be moved simultaneously with respect to their radial distances from the axis of the torsiograph carrier. One of the pendulum rods $B^5$ which is extended for the purpose in the direction of the carrier axis has mounted on it, preferably in an adjustable manner, the recording stylus D.

Figure 6:
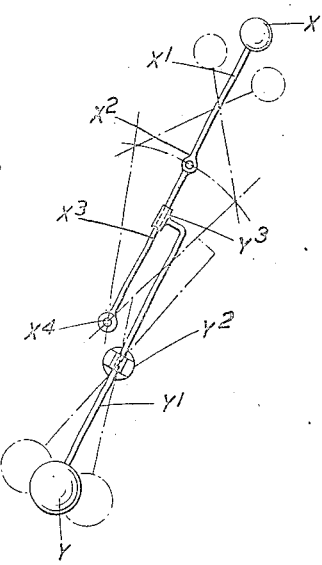
Figure 6 shows diagrammatically how two connected pendulums may be used and arranged.

In a further arrangement shown diagrammatically in Figure 6, a compound pendulum may be employed comprising two separate pendulum masses X and Y each on a separate rod. The first of these pendulum masses X is mounted on one end of a rod $X^1$ whose other end is pivoted at $X^2$ on the one end of a rod $X^3$ whose other end is pivoted at a point $X^4$ on the carrier which may or may not be coincident with the axis of the carrier. This rod $X^3$ may be referred to as an extension in the direction of the carrier axis of the first pendulum rod $X^1$. The second pendulum mass Y is mounted on the end of a rod $Y^1$ which passes through an oscillating fulcrum member $Y^2$ pivoted to the carrier $A^1$ at a distance from the axis of the latter. At the end of this second pendulum rod $Y^1$ which lies on the side of its fulcrum remote from the pendulum mass Y, this rod is connected at $Y^3$ to the rod $X^3$, this connection being a sliding one. The recording stylus may be mounted either on the rod $X^1$ of the first pendulum or on the rod $Y^1$ of the second pendulum whichever may be convenient. The length of the second pendulum rod $Y^1$ with respect to its fulcrum can be varied by sliding the rod through its fulcrum member $Y^2$. Such variation will also move in a radial direction the sliding connection $Y^3$ between the end of the second pendulum rod $Y^1$ and the rod $X^3$.

Figure 8:
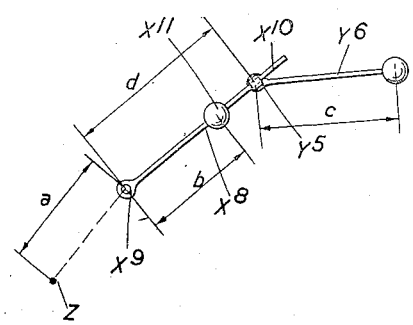
Figure 8 is a diagrammatic view of another arrangement in which two connected pendulums are used.
Figure 7:
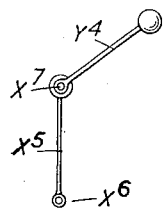
Figure 7 shows similarly another arrangement of two connected pendulums.

In yet another arrangement the recording pendulum may be with two or more degrees of freedom, two connected pendulums being used and both lying on the same side of the centre of rotation. For example in a simple form as shown in Figure 7 a pendulum rod $X^5$ pivoted at or about the axis $X^6$ of the carrier has pivotally connected to its end at $X^7$ a second pendulum rod $Y^4$. In a modification of this arrangement shown in Figure 8 what may be called the first pendulum rod $X^8$ is pivoted at a point $X^9$ on the carrier suitably distant from the axis Z of the latter and this pendulum rod is extended at $X^{10}$ beyond the pendulum mass $X^{11}$ thereon. On this pendulum rod or on its extension is pivoted at $Y^5$ a second pendulum $Y^6$ the position of whose fulcrum $Y^5$ may be movable along the rod $X^{10}$. In this arrangement the distance $a$ and the lengths $b$ and $c$ are constant and the distance $d$ variable.

Figure 9:
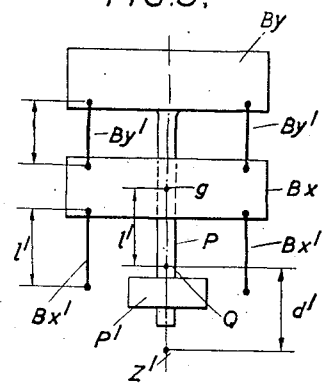
Figure 9 is a diagrammatic end view of a simple system such as shown in Figure 8.

A pendulum arrangement of this nature lends itself to practical application with bi-filar suspension of the pendulum masses. For example as shown diagrammatically in Figure 9 the first pendulum mass $Bx$ may be suspended by twin links $Bx^1$ from points on the carrier. The second pendulum mass $By$ may be similarly suspended by two links $By^1$ from the first pendulum mass $Bx$. The second pendulum mass $By$ is provided with a rod P which extends towards the axis $Z^1$ of the carrier and has thereon a mass $P^1$ whose position along this rod can be varied thus varying the radial position of the centre of gravity of the whole of the second pendulum and in this way naturally affecting the radial position of the centre of gravity of the whole pendulum system. The point of application of each pendulum is obtained by subtracting the pendulum length from the distance between the axis of rotation $Z^1$ and the centre of gravity of the system. Here for the pendulum $Bx$ with a length $l'$ and centre of gravity at $g$, the effective point of application is at Q. In order to vary the distance $d'$ between Z and Q the weight $P^1$ is moved along the rod P. The mass of this weight and the length of the rod P are determined so that the virtual point of suspension of the pendulum $By$ will lie along the rod P between the point Q and the place where the rod P extends from the mass $By$.

Figure 10:
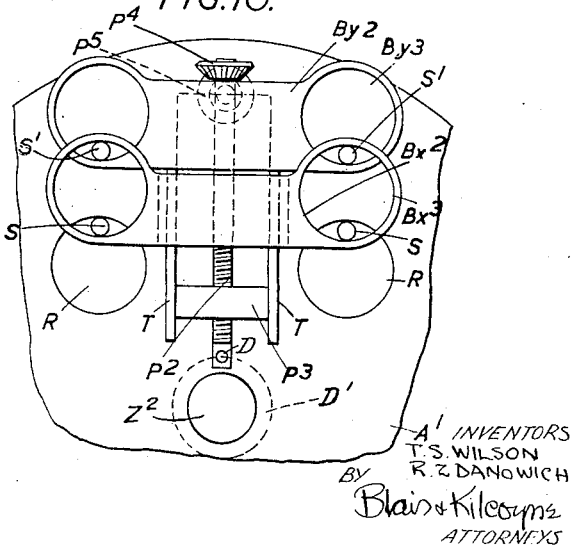
Figure 10 shows somewhat diagrammatically how such an arrangement as is illustrated in Figures 8 and 9 may be carried out in practice.

A practical construction of such an arrangement may for example be as shown in Figure 10 wherein the drive is mounted on a shaft $D'$. The bi-filer suspension of the pendulum rod, in accordance with known practice in a pendulum damper device, may be effected by employing rollers or pins which fit loosely inside holes in the several parts. Thus suitably spaced apart there may be two holes R of convenient dimensions in the face of the carrier $A^1$. The first pendulum mass $Bx^2$ is of elongated form with a hole $Bx^3$ of suitable size in each end. A pin or roller S of less diameter than the holes rests in each of the above-mentioned holes R in the carrier and also in the hole $Bx^3$ at one end of the pendulum mass. The latter is thus suspended at two points by the two pins S from the carrier, but is free to swing as these pins roll in the holes in the two parts. There is a similar connection between this first pendulum mass and the second and substantially similar pendulum mass $By^2$ which has a hole $By^3$ at each end and a pin $S^1$ which lies in each hole and also in the hole $B^{x3}$ in the corresponding end of the first pendulum mass $Bx^2$. The second pendulum mass $By^2$ has a screwthreaded rod $P^2$ extending inwardly, that is towards the axis $Z^2$ of the carrier, with a weight $P^3$ thereon whose position along this rod is adjustable by rotation of the rod. The weight $P^3$ is guided and held against rotation by guides T extending from the second pendulum mass $By^2$. The weight can be moved radially between these guides by rotation of the rod $P^2$ through the bevel wheels $P^4$, $P^5$. A stylus D may be mounted on the rod $P^2$ for marking on a suitably driven strip of paper.

The constructional details may vary according to the particular form in which the improved torsiograph is made as indicated above.

What we claim as our invention and desire to secure by Letters Patent is:

1. In a torsiograph the combination of a shaft the torsional vibrations of which are to be recorded, a mass mounted on the shaft so that it can swing thereon as a pendulum about at least one axis which is parallel to but not coincident with the shaft axis, a stylus moved by and in accordance with the movements of the said mass relatively to the shaft as the latter rotates, said stylus being adapted to make a record of its movements on a strip of material carried on and rotating as a whole with the shaft, and means for moving the strip relatively to the stylus.

2. In a torsiograph the combination of a shaft the torsional vibrations of which are to be recorded, a carrier attachable to the shaft for rotation therewith, a mass mounted on the carrier so that it can move relatively to the shaft by swinging as a pendulum in a plane normal to the shaft axis and about at least one axis which is not coincident with the shaft axis, a stylus moved by and in accordance with the movements of the said mass relatively to the shaft as the latter rotates, said stylus being adapted to make a record of its movement on a strip of material carried on and rotating as a whole with the carrier, and means for moving the strip relatively to the stylus.

3. In a torsiograph the combination of a shaft the torsional vibrations of which are to be recorded, a mass mounted on the shaft so that it can move relatively thereto by swinging as a pendulum about at least one fulcrum the axis of which is parallel to and at a determined distance from the shaft axis, means for altering the distance of this fulcrum axis from the shaft axis, a stylus moved by and in accordance with the movements of the said mass relatively to the shaft as the latter rotates, said stylus being adapted to make a record of its movement on a strip of material carried on and rotating as a whole with the shaft, and means for moving the strip relatively to the stylus.

4. In a torsiograph the combination of a shaft the torsional vibrations of which are to be recorded, a mass mounted on the shaft so that it can move relatively thereto by swinging as a pendulum about at least one fulcrum the axis of which is parallel to and at a determined distance from the shaft axis, means for altering the effective length of the pendulum from its fulcrum axis, a stylus moved by and in accordance with the movements of the said mass relatively to the shaft as the latter rotates, said stylus being adapted to make a record of its movement on a strip of material carried on and rotating as a whole with the shaft, and means for moving the strip relatively to the stylus.

5. In a torsiograph the combination of a shaft the torsional vibrations of which are to be recorded, a mass mounted on the shaft so that it can move relatively thereto by swinging as a pendulum about at least one fulcrum the axis of which is parallel to and at a determined distance from the shaft axis, means for altering the distance of this fulcrum axis from the shaft axis, means for altering the effective length of the pendulum from its fulcrum axis, a stylus moved by and in accordance with the movements of the said mass relatively to the shaft as the latter rotates, said stylus being adapted to make a record of its movement on a strip of material carried on and rotating as a whole with the shaft, and means for moving the strip relatively to the stylus.

6. In a torsiograph the combination of a shaft the torsional vibrations of which are to be recorded, a mass mounted on the shaft so that it can move relatively thereto by swinging as a pendulum about at least one fulcrum the axis of which is parallel to and at a determined distance from the shaft axis, means for altering the distance of this fulcrum axis from the shaft axis while the shaft is rotating, means for altering the effective length of the pendulum from its fulcrum axis while the shaft is rotating, a stylus moved by and in accordance with the movements of the said mass relatively to the shaft as the latter rotates, said stylus being adapted to make a record of its movement on a strip of material carried on and rotating as a whole with the shaft, and means for moving the strip relatively to the stylus.

7. In a torsiograph the combination of a shaft the torsional vibrations of which are to be recorded, a mass mounted on the shaft so it can swing thereon about at least one axis which is parallel to but not coincident with the shaft axis, a second mass which can swing as a pendulum from the said first mass about at least one axis which is parallel to but spaced apart from the axis about which the first mass swings, a stylus moved by and in accordance with the movements of one of the said masses relatively to the shaft as the latter rotates, said stylus being adapted to make a record of its movement on a strip of material carried on and rotating as a whole with the shaft, and means for moving the strip relatively to the stylus.

8. In a torsiograph the combination of a shaft the torsional vibrations of which are to be recorded, a carrier member attachable to the shaft for rotation therewith, a mass mounted on the carrier so that it can move relatively to the shaft by swinging from the carrier in a plane normal to the shaft axis and about at least one axis which is not coincident with the shaft axis, a second mass which can swing as a pendulum from the said first mass in a plane normal to the shaft axis and about at least one axis which is spaced apart from the axis about which the first mass swings, a stylus moved by and in accordance with the movements of one of the said masses relatively to the shaft as the latter rotates, said stylus being adapted to make a record of its movement on a strip of material carried on and rotating as a whole with the carrier, and means for moving the strip relatively to the stylus.

THOMAS SYDNEY WILSON.
RICHARD ZDANOWICH.